US009938767B2

(12) United States Patent
Kummer et al.

(10) Patent No.: US 9,938,767 B2
(45) Date of Patent: Apr. 10, 2018

(54) OBJECT TRANSFER SYSTEM FOR A FLIGHT OF STEPS

(71) Applicant: The Boeing Company, Seal Beach, CA (US)

(72) Inventors: Thomas A. Kummer, Stanwood, WA (US); Donald K. Crenshaw, Snohomish, WA (US); Janice A. Goegan, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 549 days.

(21) Appl. No.: 14/523,879

(22) Filed: Oct. 25, 2014

(65) Prior Publication Data

US 2016/0115735 A1    Apr. 28, 2016

(51) Int. Cl.
*E06C 7/12* (2006.01)
*B62B 5/02* (2006.01)
*E06C 7/16* (2006.01)
*A45C 5/14* (2006.01)
*E04F 11/18* (2006.01)

(52) U.S. Cl.
CPC .................. *E06C 7/12* (2013.01); *B62B 5/02* (2013.01); *E06C 7/16* (2013.01); *A45C 2005/147* (2013.01); *E04F 2011/1868* (2013.01)

(58) Field of Classification Search
CPC ... E06C 7/12; E06C 7/16; E06C 1/397; A45C 2005/147; B62B 5/02; A61G 5/061; B61B 13/04

USPC .................................................. 187/200–202
See application file for complete search history.

(56) References Cited

U.S. PATENT DOCUMENTS

| | | | | |
|---|---|---|---|---|
| 2,832,436 A | * | 4/1958 | Roberts | B62B 5/02 187/201 |
| 3,115,211 A | * | 12/1963 | Ostrander, Jr. | E06C 7/12 182/103 |
| 3,121,476 A | * | 2/1964 | Mazzarelli | B66B 9/0838 16/96 R |
| 3,749,202 A | * | 7/1973 | Puls | B66B 9/083 182/103 |
| 3,896,904 A | * | 7/1975 | Walker | B62B 5/0003 187/231 |
| 4,183,423 A | * | 1/1980 | Lewis | E06C 7/12 182/103 |
| 4,281,849 A | * | 8/1981 | Chandick | B62B 1/12 280/652 |
| 4,354,575 A | * | 10/1982 | Andersson | B66B 9/083 187/201 |
| 4,650,035 A | * | 3/1987 | Eubanks | E06C 7/12 182/101 |
| 5,275,256 A | * | 1/1994 | Ellzey | E06C 7/14 104/246 |

(Continued)

*Primary Examiner* — Zachary L Kuhfuss
(74) *Attorney, Agent, or Firm* — Francisco A. Rubio-Campos; Apogee Law Group P.C.

(57) ABSTRACT

An object transfer system ("OTS") for a flight of steps for transporting an object on the flight of steps is disclosed. The OTS may include a rail positioned in place of a handrail on the flight of steps, a trolley assembly movably attached to the rail, and an object carrier attached to the trolley assembly. The rail has a rail length and the object carrier is configured to hold the object. Additionally, the trolley assembly is configured to transport the object held by the object carrier along the rail length.

23 Claims, 14 Drawing Sheets

(56) References Cited

U.S. PATENT DOCUMENTS

| | | | | |
|---|---|---|---|---|
| 6,216,818 B1* | 4/2001 | Moffat | ............... | E06C 1/39 |
| | | | | 182/103 |
| 6,244,381 B1* | 6/2001 | Ruble | ............... | B66B 9/187 |
| | | | | 182/103 |
| 6,533,070 B1* | 3/2003 | Elrod | ............... | E06C 1/345 |
| | | | | 182/103 |
| 6,938,740 B2 | 9/2005 | Gandy | | |
| 7,424,932 B1* | 9/2008 | Murphy | ............ | E06C 1/345 |
| | | | | 182/103 |
| 2006/0213735 A1 | 9/2006 | Weinstein et al. | | |
| 2013/0068559 A1* | 3/2013 | Grado | ............... | E06C 7/12 |
| | | | | 182/102 |
| 2013/0153334 A1* | 6/2013 | Crew | ............... | E06C 7/12 |
| | | | | 182/18 |
| 2013/0287531 A1* | 10/2013 | Connors | ............ | B66B 9/193 |
| | | | | 414/598 |
| 2014/0246271 A1* | 9/2014 | Davies | ............... | E06C 7/16 |
| | | | | 182/103 |
| 2015/0275579 A1* | 10/2015 | Reyes | ............... | E06C 7/16 |
| | | | | 182/103 |
| 2015/0300090 A1* | 10/2015 | Strand | ............... | E06C 7/12 |
| | | | | 182/103 |
| 2016/0201391 A1* | 7/2016 | West | ............... | E06C 7/48 |
| | | | | 182/129 |
| 2016/0347544 A1* | 12/2016 | Kvifte | ............... | E06C 9/08 |

* cited by examiner

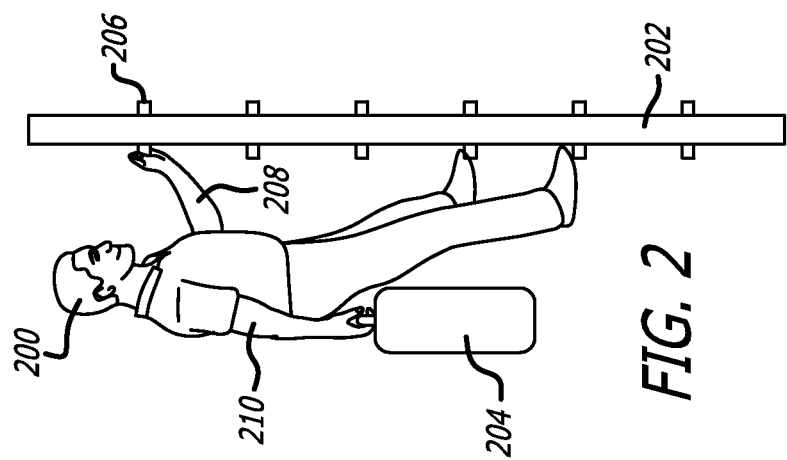
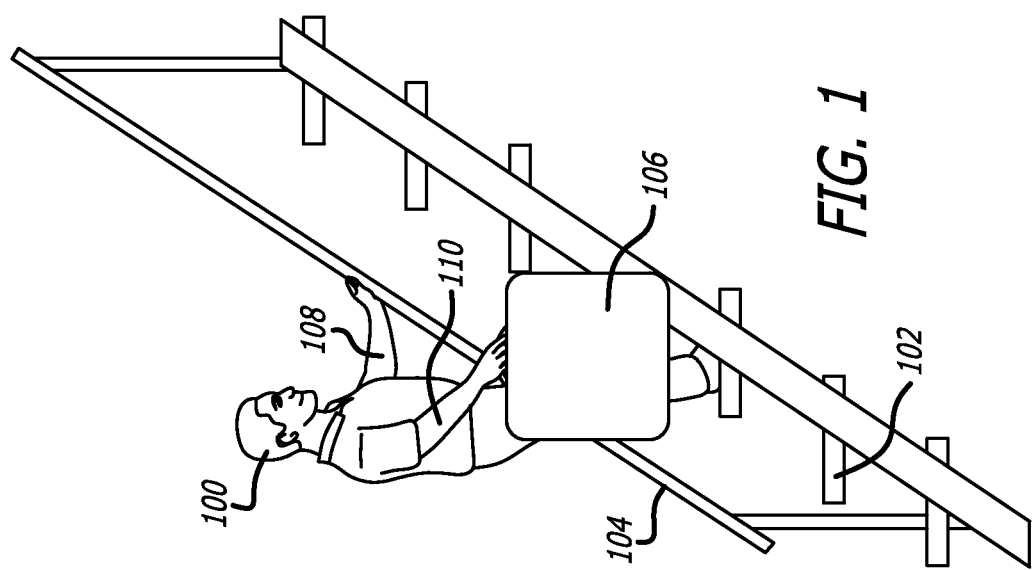

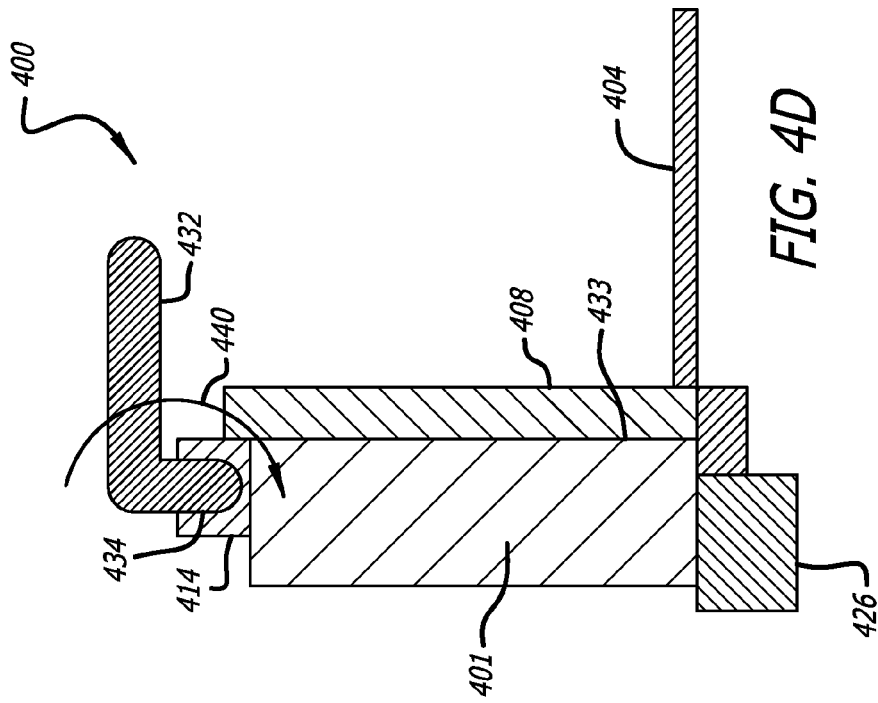
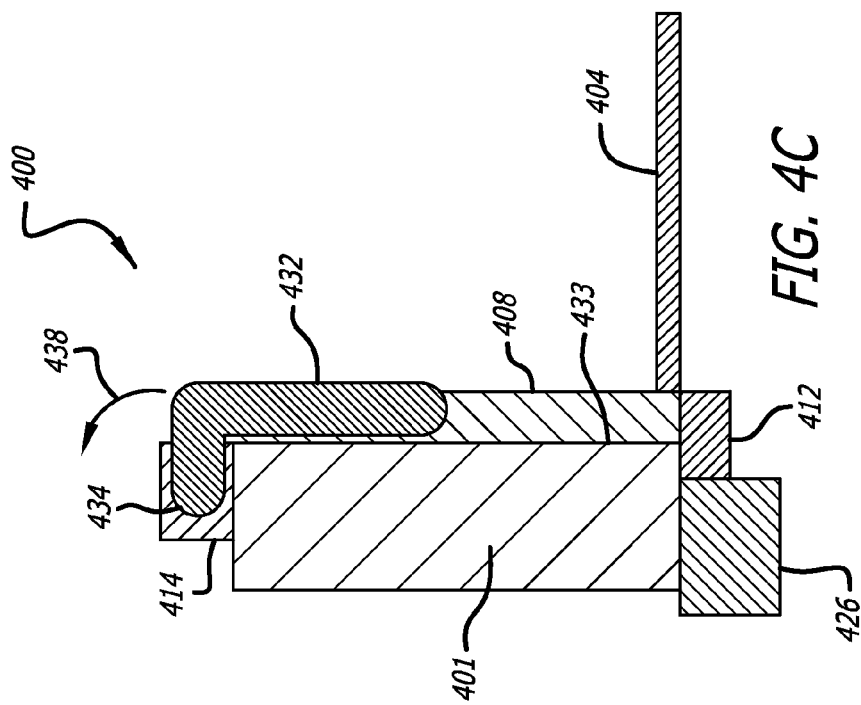

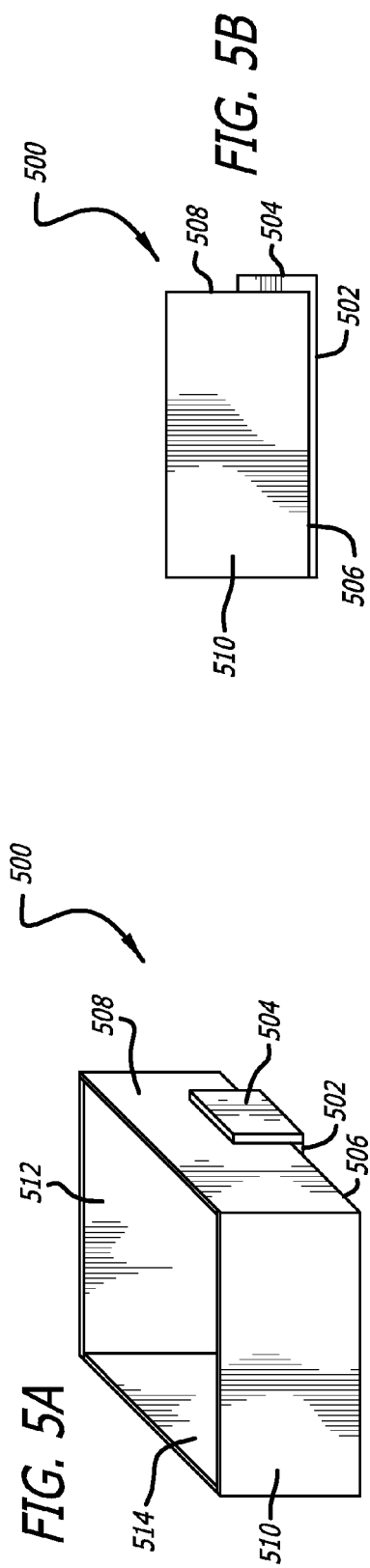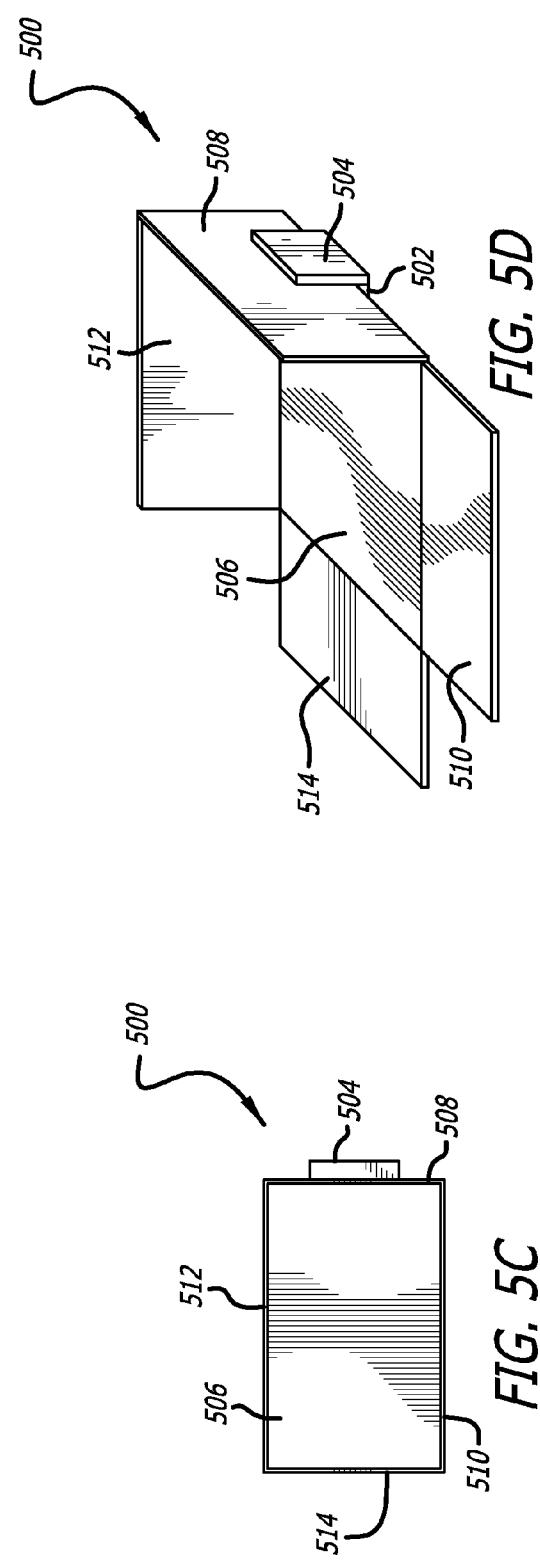

OBJECT TRANSFER SYSTEM FOR A FLIGHT OF STEPS

BACKGROUND

1. Field

The present disclosure is generally related to transportation systems and more particularly to an object transportation system for a flight of steps.

2. Related Art

Carrying luggage, boxes, or other heavy or bulky objects up or down a ladder or stairways may be hazardous. A person ascending or descending a ladder or stairway with a bulky object must usually lift, hold, and balance the bulky object while at the same time trying to hold on to the ladder or a handrail of the stairway and maintain a personal balance on the ladder or stairway. As an example in FIG. 1, a side-view of a person 100 is shown ascending a known stairway 102 having at least one handrail 104. The person 100 is carrying an object 106 that may be heavy, bulky, or both. In this example, the person 100 is only able to physically hold on to one handrail 104 with one arm 108 while holding the object 106 with the other arm 110 unassisted. This results in a potentially unsafe condition because the object 106 may cause the person 100 to trip or lose his/her balance while either ascending or descending the stairway 102. This problem is intensified in the example shown in FIG. 2.

In FIG. 2, a side-view of a person 200 is shown either ascending or descending a ladder 202 with an object 204. In this example, the person 200 is only able to physically hold on to a rung 206 of the ladder 202 with one arm 208 while holding the object 204 with the other arm 210 unassisted. In this example, the danger has increased because ascending or descending a ladder is quite dangerous when both arms 208 and 210 of the person 200 are not used to hold on to the ladder 202.

As such, there is a need for a system capable of assisting the transport an object up or down a stairway or ladder.

SUMMARY

Disclosed is an object transfer system ("OTS") for a flight of steps for transporting an object on the flight of steps. The OTS may include a rail positioned as a handrail on the flight of steps, a trolley assembly movably attached to the rail, and an object carrier attached to the trolley assembly. The rail has a rail length and the object carrier is configured to hold the object. Additionally, the trolley assembly is configured to transport the object held by the object carrier along the rail length. In this example the flight of steps may be either a stairwell or a ladder.

As an example of operation, the OTS performs as a method that includes receiving the object on the object carrier, releasing a locking system within the trolley assembly when an actuating lever is activated. The method also includes moving the trolley assembly along the rail and locking the trolley assembly after moving the trolley assembly.

Other devices, apparatus, systems, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE FIGURES

The disclosure may be better understood by referring to the following figures. The components in the figures are not necessarily to scale, emphasis instead being placed upon illustrating the principles of the disclosure. In the figures, like reference numerals designate corresponding parts throughout the different views.

FIG. 1 is a side-view of a known flight of steps showing a person carrying an object and ascending the flight of steps having a handrail.

FIG. 2 is a side-view of a known ladder showing a person carrying an object and ascending or descending the ladder.

FIG. 4C is a top-view of the OTS and handrail (shown in FIGS. 4A and 4B) showing the actuating lever in a resting position.

FIG. 4D is a top-view of the OTS and handrail (shown in FIGS. 4A, 4B, and 4C) showing the actuating lever in an operational position.

FIG. 5A is a front-perspective-view of an example of an implementation of a collapsible box as the object carrier in accordance with the present disclosure.

FIG. 5B is a front-view of the object carrier shown in FIG. 5A.

FIG. 5C is a top-view of the object carrier shown in FIGS. 5A and 5B.

FIG. 5D is a front-perspective-view of the object carrier (shown in FIGS. 5A, 5B, and 5C) showing an example of an implementation of the collapsing of the side-walls of the object carrier in accordance with the present disclosure.

DETAILED DESCRIPTION

Disclosed is an object transfer system ("OTS") for a flight of steps for transporting an object on the flight of steps. The OTS may include a rail positioned as a handrail on the flight of steps, a trolley assembly movably attached to the rail, and an object carrier attached to the trolley assembly. The rail has a rail length and the object carrier is configured to hold the object. Additionally, the trolley assembly is configured to transport the object held by the object carrier along the rail length. In this example the flight of steps includes a stairway, staircase, stairwell, flight of stairs, or a ladder. In the case of a ladder, the term ladder includes pure ladder (i.e., a very steep angled ladder or vertical ladder) or a stair-ladder. It is appreciated by those of ordinary skill in the art that a "pure ladder" (generally referred to simply as a "ladder") is a ladder that has a very steep angle of inclination with respect to the floor or is vertical with respect to the floor. A step-ladder is a ladder that has does not have a very steep angle of inclination with respect to the floor such as, for example, a 60 degree angle of inclination. In general, the term "step" in "step-ladder" refers to the common distinction on how term "step" or "steps" are typically utilized in describing different types of flights of steps. When referring to a ladder generally the step or steps of the ladder are referred to as a "rung" or "rungs."

As an example of operation, the OTS performs a method that includes receiving the object on the object carrier, releasing a locking system within the trolley assembly when an actuating lever is activated (such as, for example, pivoted, pulled, or activated in some other fashion). The method also includes moving the trolley assembly along the rail and locking the trolley assembly after moving the trolley assembly.

Figure 3B:
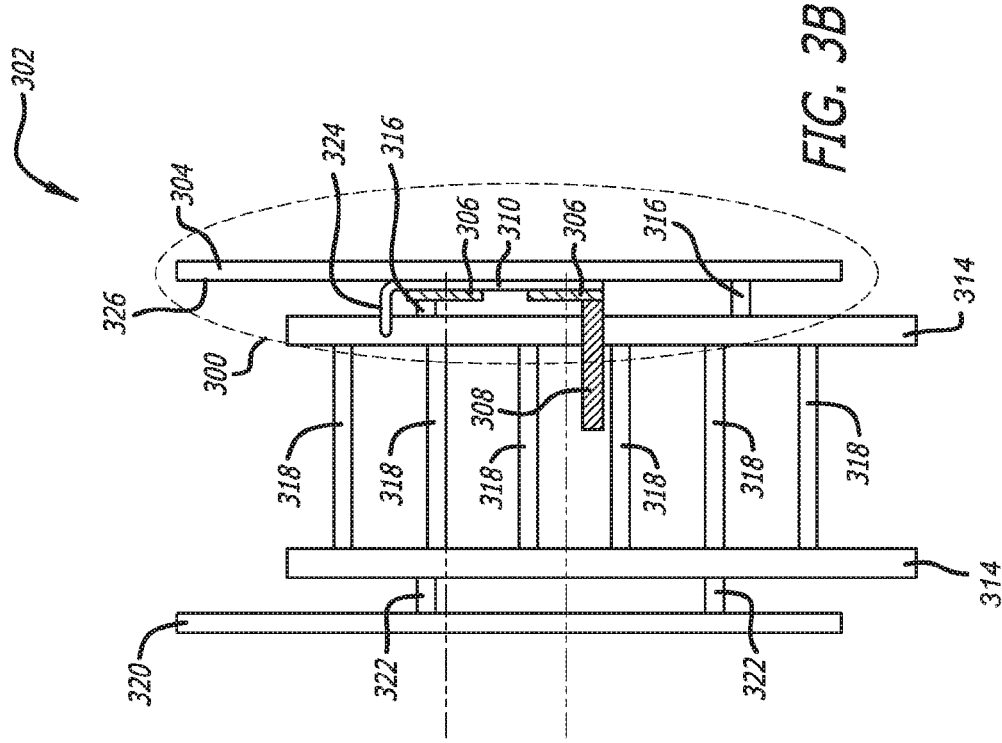
FIG. 3B is a front-view of the OTS and flight of steps, shown in FIG. 3A, in accordance with the present disclosure.
Figure 3A:
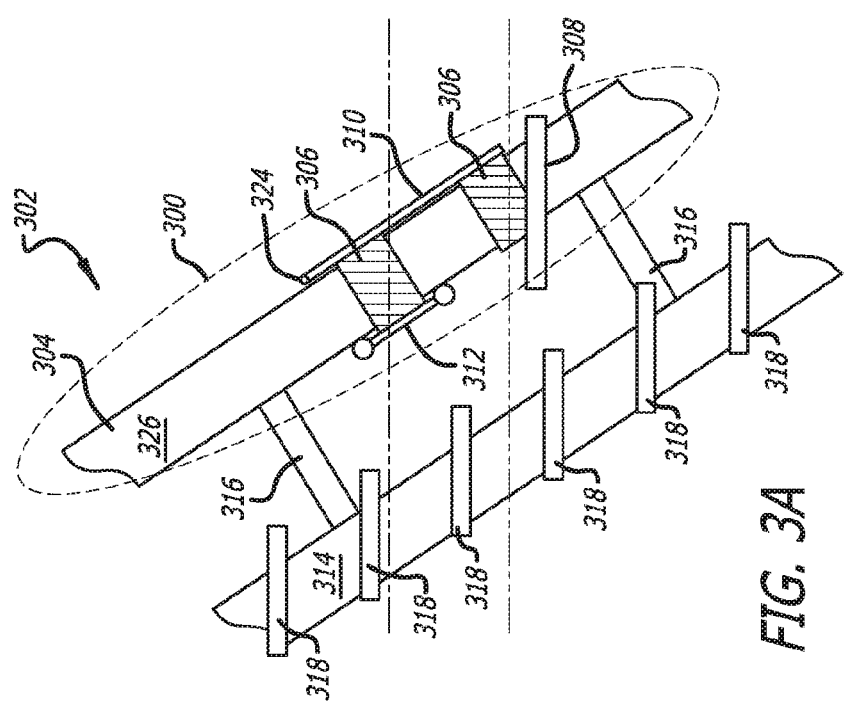
FIG. 3A is a side-view of an example of an implementation of the OTS on a flight of steps in accordance with the present disclosure.

Turning to FIG. 3A a side-view of an example of an implementation of OTS 300 on a flight of steps (in this example a stairway) 302 is shown in accordance with the present disclosure. In this example, the OTS 300 includes a first rail 304 (which in this example is a first handrail), a trolley assembly 306, an object carrier 308, and an actuating lever 310. The trolley assembly 306 may include a motion control system 312 and a locking system (not shown). The motion control system 312 is a device or mechanism that allows the trolley assembly 306 to move along the first handrail 304 in a controlled motion, i.e., a generally stable linear motion in either direction along the length of the first handrail 304. In this example, the motional control system 312 may include a braking system.

The first handrail 304 is shown attached to a base 314 of the flight of steps 302 via a plurality of first support members 316 and the flight of steps 302 is shown to have a plurality of steps 318 attached to the base 314 of the flight of steps 302. In FIG. 3B, a front-view of the OTS 300 and flight of steps 302 is shown. In this view, a second rail (which in this example is a second handrail) 320 is shown attached to the base 314 of the flight of steps 302 via a plurality of second support members 322.

In this example, the actuating lever 310 may be an articulating actuating lever that includes a handle (which may be a pivoting handle) 324. The actuating lever 310 may be configured to pivot perpendicularly from the first handrail 304. In an example of operation, the actuating lever 310 would pivot the pivoting handle 324 from a resting position adjacent to an inner surface 326 of the first handrail 304 to an operational position pivotally away from the first handrail 304. By pivoting the actuating lever 310, the actuating lever 310 either locks the trolley assembly 306 in a position along the first handrail 304 or releases the trolley assembly 306 for free movement along the first handrail 304. Specifically, in this example, the OTS 300 is configured such that the trolley assembly 306 is locked in a position along the first handrail 304 when the actuating lever 310 is in the resting position adjacent to the inner surface 326 of the first handrail 304. As such, the resting position of the actuating lever 310 may also be referred to as the "locking position" of the actuating lever 310 that results in the trolley assembly 306 being in a "locked position." The trolley assembly 306 is released from the locked position and allowed to move freely along the length of the first rail (i.e., the first handrail) 304 once the pivoting handle 324 is pivoted away from the inner surface 326 (i.e., the resting or locking position) to the operational position. The actuating lever 310 may lock and release the trolley assembly 306 with the motion control system 312 or with a locking system (not shown) located proximate to the actuating lever 310. The locking system may be optionally either part of the motion control system 312 or a separate device or mechanism connected to the actuating lever 310.

Figure 4B:
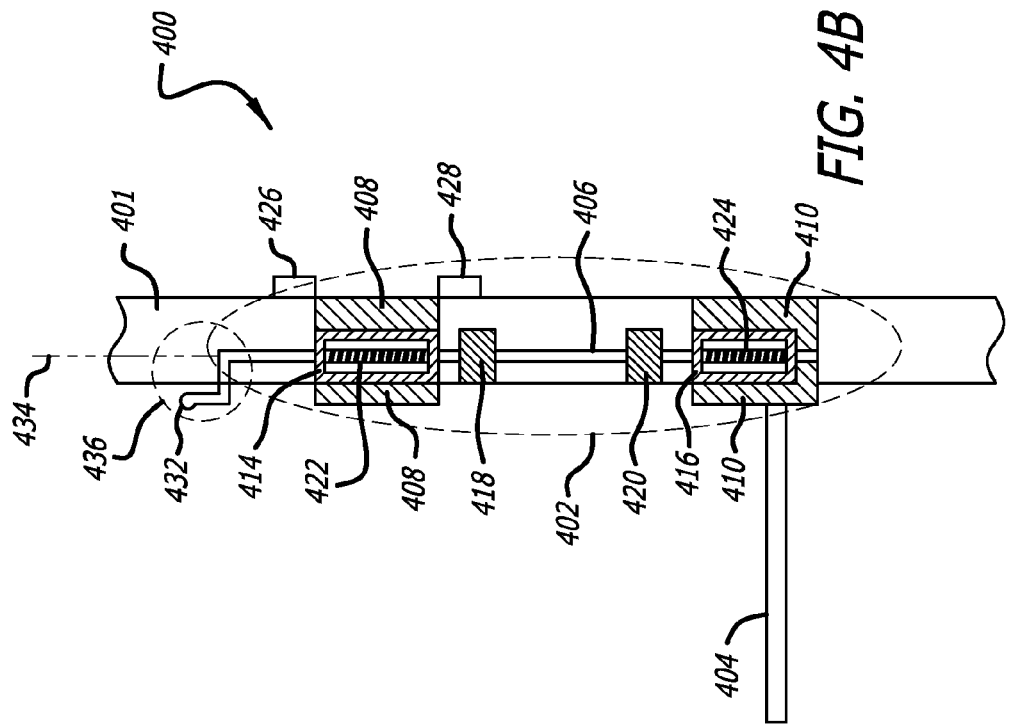
FIG. 4B is a front-view of the OTS shown in FIG. 4A.
Figure 4A:
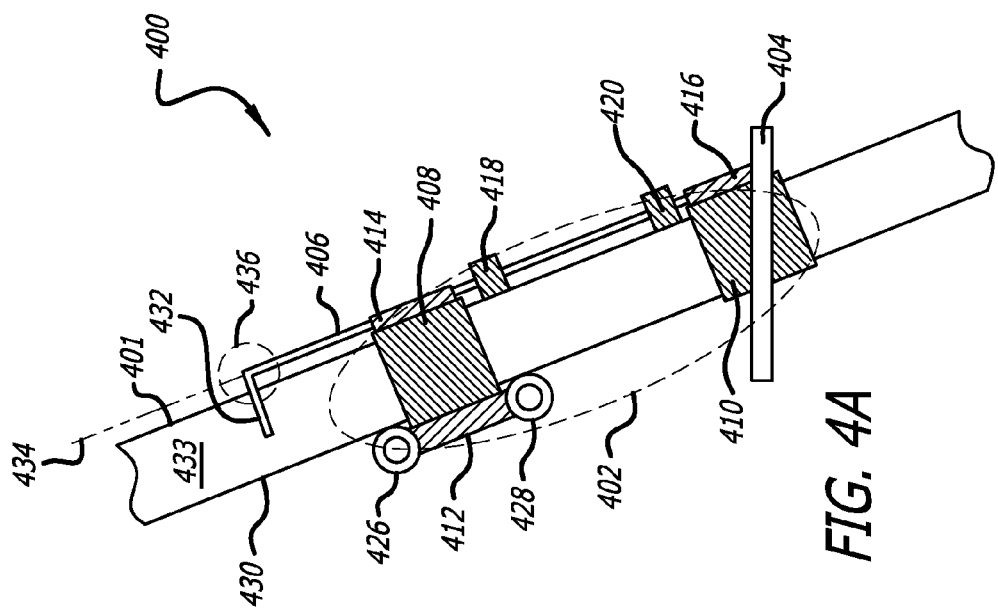
FIG. 4A is a side-view of an example of an implementation of the OTS shown in FIGS. 3A and 3B in accordance with the present disclosure.

As mentioned earlier, the trolley assembly 306 may include a motion control system 312 and a locking system (not shown). The locking system prevents the motion of the trolley assembly 306 along the first handrail 304 when the actuating lever 310 is in the locking position (i.e., the resting position). The locking system may optionally be part of the motion control system 312 or a separate device or mechanism. In general the locking system is shown in FIGS. 4A and 4B. The motion control system 312 may include a braking system (not shown) such as, for example, a friction unidirectional brake clutch that is configured to control the movement of the trolley assembly 306 in a downward direction along the length of the handrail 304. This is a safety feature of the OTS 300 that prevents a bulky and/or heavy object (such as, for example, a piece of luggage or package) that is placed on the object carrier 308 from falling down the flight of steps 302.

In FIG. 4A, a side-view is shown of an example of an implementation of the OTS 400 shown in FIGS. 3A and 3B. Similarly, FIG. 4B is a front-view of the OTS 400 shown in FIG. 4A. As stated earlier, the OTS 400 includes the rail (i.e., a handrail) 401, the trolley assembly 402, an object carrier 404, and the actuating lever 406. In this example, the trolley assembly 402 may have a first trolley 408, second trolley 410, and a motion control system. The motion control system may include a braking system 412, a first spring loaded module 414, a second spring loaded module 416, a first locking mechanism 418, and a second locking mechanism 420. In this example, the first and second locking mechanisms 418 and 420 are part of the previously described locking system and are generally spring loaded mechanisms. The first spring loaded module 414 includes a first spring 422 and the second spring loaded module 416 includes a second spring 424. The locking system may include any locking mechanism that will prevent the first trolley 408, second trolley 410, or both from sliding down the length of the handrail 401.

In this example, the braking system 412 may include two wheels 426 and 428 that slide along the bottom side 430 of the handrail 401. The braking system 412 may include any braking mechanism that will prevent the first trolley 408 from sliding down the length of the handrail 401 in an uncontrollable manner—i.e., sliding down the length of the handrail 401 at an uncontrolled speed. In this example, the two wheels 426 and 428 act as two friction clutches that are configured to slow down the first trolley 408 and maintain the speed of descent, as it slides down the length of the handrail 401, to a controlled speed.

The actuating lever 406 may have a handle 432 that extends out perpendicularly from the axis of actuating lever 406. The actuating lever 406 is configured to pivot about the axis 434 of the actuating lever 406. As such, the handle 432 is a pivoting handle 432 that also pivots about the axis 434 of the actuating lever 406. In this example, the actuating lever 406 also includes a bend 436 prior to the pivoting handle 432 that is configured to allow the pivoting handle 432 to be in a resting position adjacent to the inner surface 433 of the handrail 401. In this example, the actuating lever 406 extends from the first trolley 408 to the second trolley 410 through the first locking mechanism 418 and second locking mechanism 420. The actuating lever 406 may be a metal rod (such as, for example, steel) that is physically strong enough to link both the first trolley 408 and the second trolley 410 into one piece, which with the motion control system 412 defines the trolley assembly 402. It is appreciated by those of ordinary skill in the art that trolley assembly 402 may alternatively use just one trolley sub-device instead of two or that the first trolley 408 and second trolley 410 may be attached to each other via some other type of known means to form a single trolley assembly 402.

Turning to FIGS. 4C and 4D, a top-view of the OTS 400 is shown along the handrail 401. In FIG. 4C, the pivoting handle 432 is shown to be in a locking position that is adjacent to the inner surface 433 of the handrail 401. In FIG. 4D, the pivoting handle 432 is shown to be in an operational position that is perpendicular and pivotally away from the inner surface 433 of the handrail 401. In this example, the operation position is about 90 degrees away from the locking position. The actuating lever 406 and pivoting handle 432 pivot in an upward rotational motion 438 when rotating from the locking position to the operational position. Similarly, the actuating lever 406 and pivoting handle 432 pivot in a downward rotational motion 440 when rotating from the operational position to the locking position. The first spring 422 and second spring 424 may be preloaded springs that are set to resist the pivoting motion of the actuating lever 406 in the upward rotational motion 438 and return the actuating lever 406 to the resting position from the operational position, via the downward rotational motion 440.

The first and second locking mechanisms 418 and 420 are configured to stop the upward rotational motion 438 of the actuating lever 406 once it reaches the operational position approximately 90 degrees away from the locking position adjacent to the inner surface 433 of the handrail 401. In the operational position, a user of the OTS 400 may pull the pivoting handle 432 up or slide down the trolley assembly 402 the length of the handrail 401 thus either carrying up or down an object (such as, for example, a piece of luggage or a package) placed on the object carrier 404.

The actuating lever 406 is also connected to the locking system through the first trolley 408 such that the pivotal movement of the actuating lever 406 along the axis 434 causes the locking system 412 to switch between a locked or free-moving state. As an example, when the actuating lever 406 is in the locking position, the actuating lever 406 may be mechanically coupled to the locking system in a fashion that causes the locking system to be placed in a locked state. Once the actuating lever 406 is pivoted to the operational position, the new position of the actuating lever 406 may cause the locking system to be placed in a free-moving state that allows the first trolley 408 to move along the handrail 401.

In this example, the braking system 412 is shown attached to the bottom of the first trolley 408 which acts as a carriage assembly. As described earlier, the braking system 412 may include the two wheels 426 and 428 that act as two friction clutches when moving the braking system 412 in a downward direction descending along the handrail 401. In this example, the wheels 426 and 428 may free wheel (i.e., move freely without resistance) when ascending along the length of the handrail 401. However, when descending along the length of the handrail 401, the wheels 426 and 428 are permanently engaged to brake so as to cause the trolley assembly 402 to descend along the handrail 401 at a controlled speed.

Figure 4E:
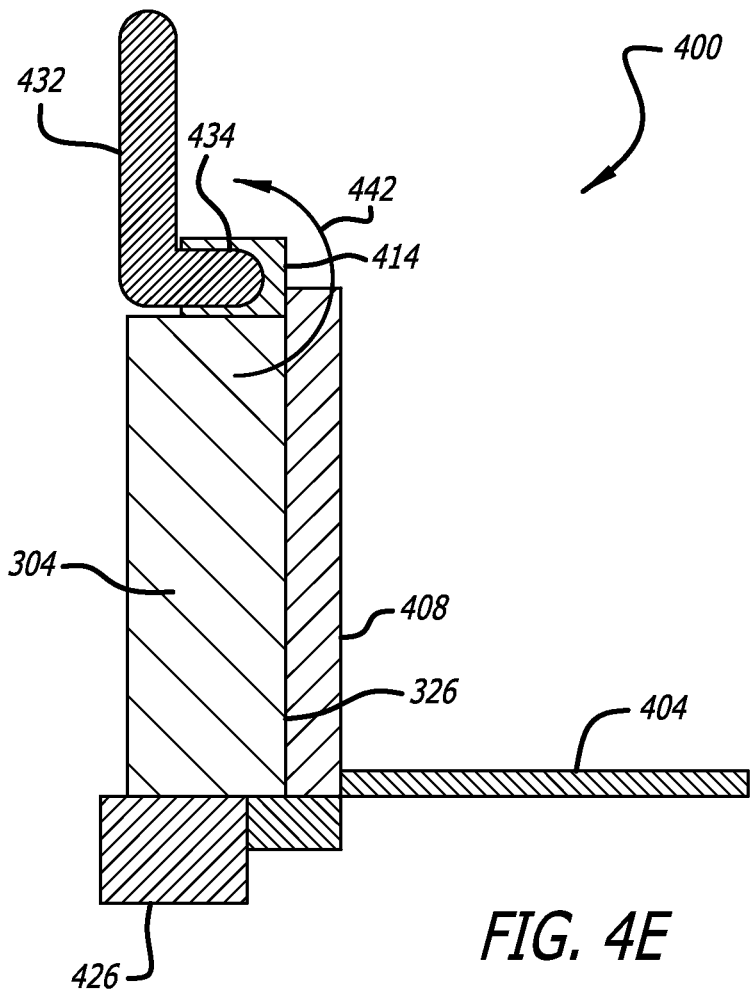
FIG. 4E is a top-view of the OTS and handrail (shown in FIGS. 4A through 4D) showing the actuating lever in an automatic descend position.

Turning to FIG. 4E, the pivoting handle 432 is shown in a third position that is approximately 90 degrees away and upward from the operational position and about 180 degrees away and upward from the locking position. Again, the actuating lever 406 and pivoting handle 432 pivot in a further upward rotational motion 442 when rotating from the operational position to the third position. In this example, the third position may be an automatic descend position that allows the trolley assembly 402 to automatically descend along the handrail 401 at a controlled speed until it reaches the bottom of the handrail 401. Once the trolley assembly 402 reaches the bottom of the handrail 401, the locking mechanism may include a sub-mechanism (not shown) that snaps the locking mechanism out of the automatic descent mode into the locked resting mode. This sub-mechanism may also cause the actuating lever 406 and pivoting handle to pivot back to the locked position from the automatic descent position.

The object carrier 404 may be a flat retractable platform (as shown in FIGS. 3A through 4E) or a foldable and collapsible box (or cage). Turning to FIG. 5A, perspective-front-view of an example of an implementation of a collapsible box as the object carrier 500 is shown. The object carrier 500 includes an object carrier base 502 and attachment plate 504 for attaching the object carrier 500 to the second trolley 410. Additionally, the object carrier 500 may include a base wall 506, a first, second, third, and fourth side-walls 508, 510, 512, and 514, respectively. In FIG. 5B, a front-view of the object carrier 500 is shown and, in FIG. 5C, a top-view of the object carrier 500 is shown.

Figure 5E:
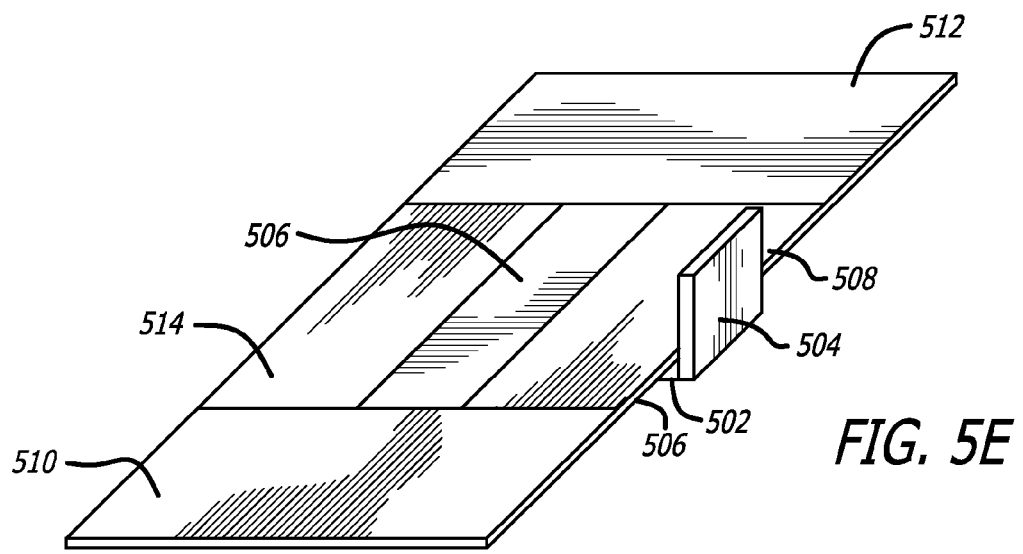
FIG. 5E is another front-perspective-view of the object carrier where all the side-walls (shown in FIGS. 5A and 5D) have been collapsed and the first and fourth side-walls have been folded over onto the base wall.
Figure 5F:
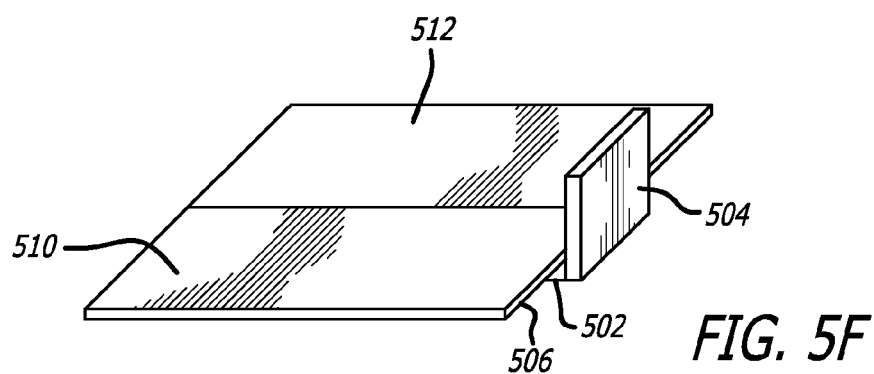
FIG. 5F is yet another front-perspective-view of the object carrier where the second and third side-walls have been folded on top of the folded first and fourth side-walls as shown in FIG. 5E.

Turning to FIG. 5D, another front-perspective-view of the object carrier 500 is shown. However, in this view, an example of an implementation of the collapsing of the side-walls 508, 510, 512, and 514 of the object carrier 500 is shown in accordance with the present disclosure. Specifically, in this example, the second and fourth side-walls 510 and 514 are shown as collapsed. Further in FIG. 5E, another front-perspective-view of the object carrier 500 is shown where the all the side-walls 508, 510, 512, and 514 have been collapsed and the first 508 and fourth 514 side-walls have been folded over onto the base wall 506. In FIG. 5F, yet another front-perspective-view of the object carrier 500 is shown where the second 510 and third 512 side-walls have been folded on top of the folded first 508 and fourth 514 side-walls (as shown in FIG. 5E). The object carrier base 502 may then be rotated and folded so that it will lay adjacent to the inner surface 433 of the handrail 401.

Figure 6:
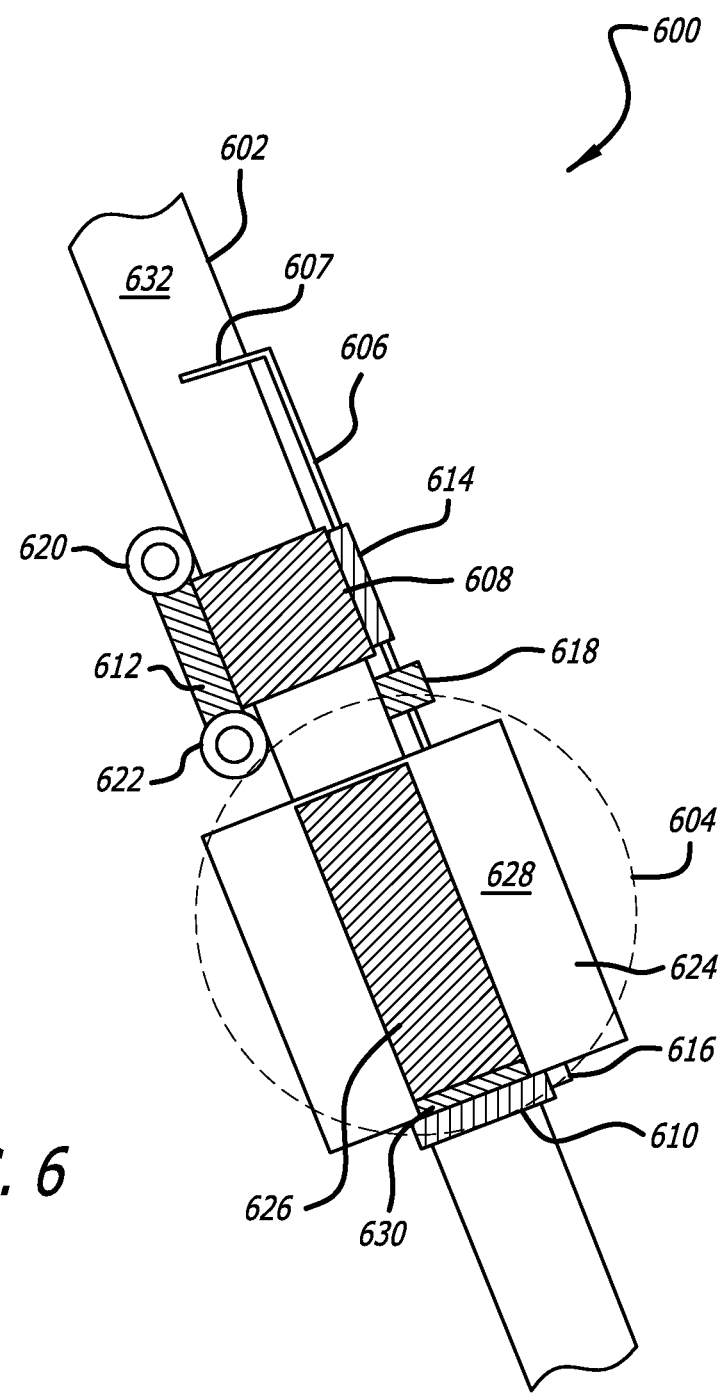
FIG. 6 is a side-view of an example of another implementation of the OTS in accordance with the present disclosure.

In FIG. 6, a side-view of an example of another implementation of the OTS 600 is shown in accordance with the present disclosure. Similarly, to the example described in FIG. 4A through 4E, in this example, the OTS 600 includes the handrail 602, the trolley assembly (which is partially blocked in this view), an object carrier 604 (which is partially blocking the trolley assembly), and the actuating lever 606 having a handle 607 (which may be a pivoting handle). In this example, the trolley assembly may have a first trolley 608, second trolley 610 (partially blocked by the object carrier 604), a motion control system 612, and a locking system. The locking system 612 may include the first spring loaded module 614, the second spring loaded module 616, the first locking mechanism 618, and the second locking mechanism (not shown because it is blocked by the object carrier 604). The motion control system 612 may include the two wheels 620 and 622 that are configured to function as friction clutches for slowing down the speed of descent of the trolley assembly along the handrail 602 to a controlled speed.

In this example, the object carrier 604 includes a collapsible box 624 as described earlier in relation to FIGS. 5A through 5F. The object carrier 604 includes an object carrier base 626 and the collapsible box 624. The collapsible box includes a base wall 628 that is attached to the object carrier base 626. The object carrier 604 may also include an attachment plate or mechanism (not shown) that couples the object carrier 604 to the second trolley 610. The attachment mechanism may include a hinge 630 that is configured to fold the collapsed box 624 towards the inner surface 632 of the handrail 602. The attachment mechanism may also include a pivoting mechanism (not shown) that allows the collapsed box 624 to be aligned with the direction of the handrail 602.

Figure 7:
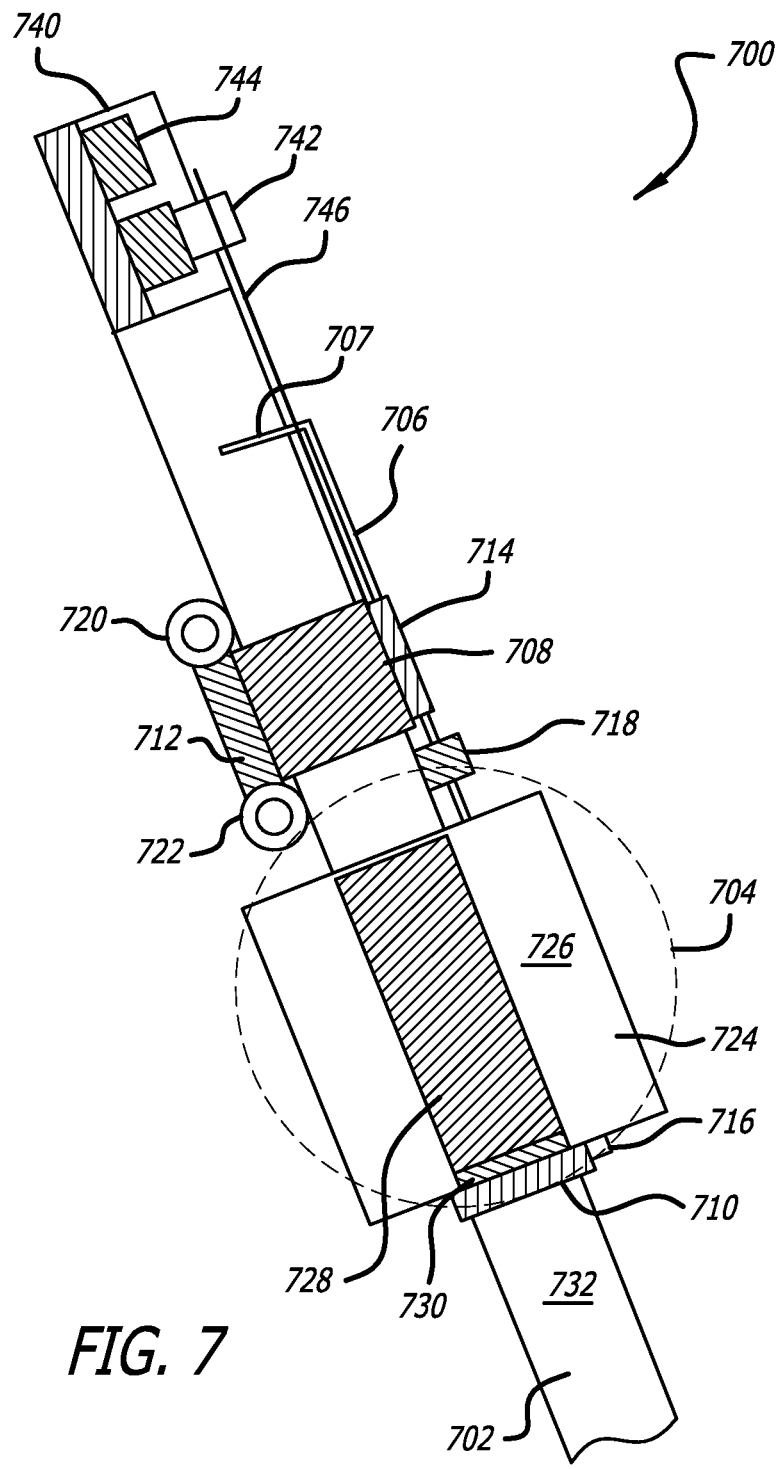
FIG. 7 is a side-view of an example of yet another implementation of the OTS in accordance with the present disclosure.

Turning to FIG. 7, a side-view of an example of yet another implementation of the OTS 700 is shown in accordance with the present disclosure. Similarly, to the example described in FIG. 4A through 4E and FIG. 6, in this example, the OTS 700 includes the handrail 702, the trolley assembly, an object carrier 704, and the actuating lever 706 having a pivoting handle 707. In this example, the trolley assembly may have a first trolley 708, second trolley 710, and a motion control system. The motion control system may include the braking system 712, the first spring loaded module 714, the second spring loaded module 716, the first locking mechanism 718, and the second locking mechanism (not shown). The braking system 712 includes the two wheels (configured to function as friction clutches) 720 and 722. Similar to the OTS 600 shown in FIG. 6, in FIG. 7, the OTS 700 also includes the collapsible box 724 having a base wall 726, object carrier base 728, and a hinge 730. Additionally, the handrail 702 includes an inner surface 732.

In this example, the OTS 700 also includes a lifting assist mechanism 740 that may include the first and second retractable reels 742 and 744. The lifting assist mechanism 740 may be attached to the top end of the handrail 702. The first retractable reel 742 may include a spring loaded mechanism or alternatively an electrical motor. The first retractable reel 742 is attached to a first end of a flexible material 746 that is also attached (at the second end of the flexible material 746) to the trolley assembly at, for example, the first trolley 708. The flexible material 746 may be, for example, a metal or nylon cable. As an example, the metal cable may be a galvanized steel cable and the retractable reels 742 and 744 may be metal reels such as, for example, steel reels. The first and second retractable reels 742 and 744 may act as a pulley system where the first retractable reel 742 acts to engage the flexible material 746.

In an example of operation, the lifting assist mechanism 740 is configured to assist the lowering and raising of the trolley assembly (and any heavy or bulky object in the collapsible box) along the handrail 702. As a safety feature the lifting assist mechanism 740 and the braking system 712 are configured to prevent the trolley assembly from accidently descending along the handrail 702 uncontrollably. Additionally, as mentioned earlier, the actuating lever 706 may also be configured to have a second position (i.e., the automatic descend position) of operation that allows for the automatic lowering of the trolley assembly. Specifically, the actuating lever 706 may be configured to pivot between a locking position to an operational position at 90 degrees and then further to an automatic descent position at 180 degrees from the locking position. In this example, the first locking mechanism 718 and second mechanism (not shown) may operate in combination with the first spring loaded module 714 utilizing a keyway that would lock the actuating lever 706 in place once it is pivoted 180 degrees from the locking position and pulled upward a bit to engage the keyway with either the first spring loaded module 714 or first locking mechanism 718. In this example, the pivoting handle 707 would extend perpendicularly outward from the top of the handrail 702. Once engaged in the automatic descent position, the locking mechanism of the locking system 712 would be disabled and the trolley assembly would descend automatically along the handrail 702. The combination of the lifting assist mechanism 740 and braking system 712 would allow the trolley assembly to slide down the handrail 702 at a controlled speed. In this example, a person would be able to use the OTS 700 to have a heavy and/or bulky object automatically descend a flight of steps so as to allow that person to descend the corresponding flight of steps without the burden of having to carry down the object.

Figure 8:
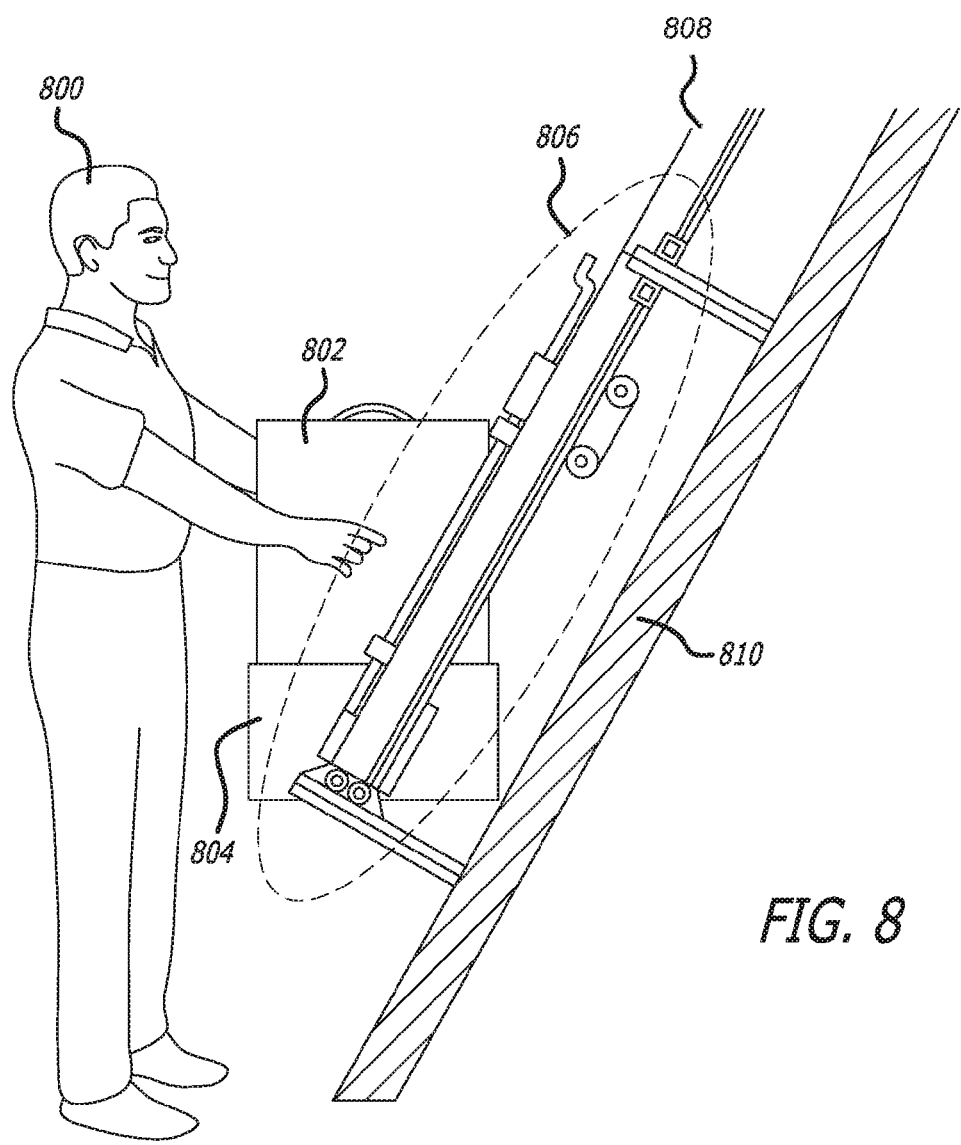
FIG. 8 is a side-view of a person loading a piece of luggage on to the collapsible box of the OTS in accordance with the present disclosure.
Figure 9:
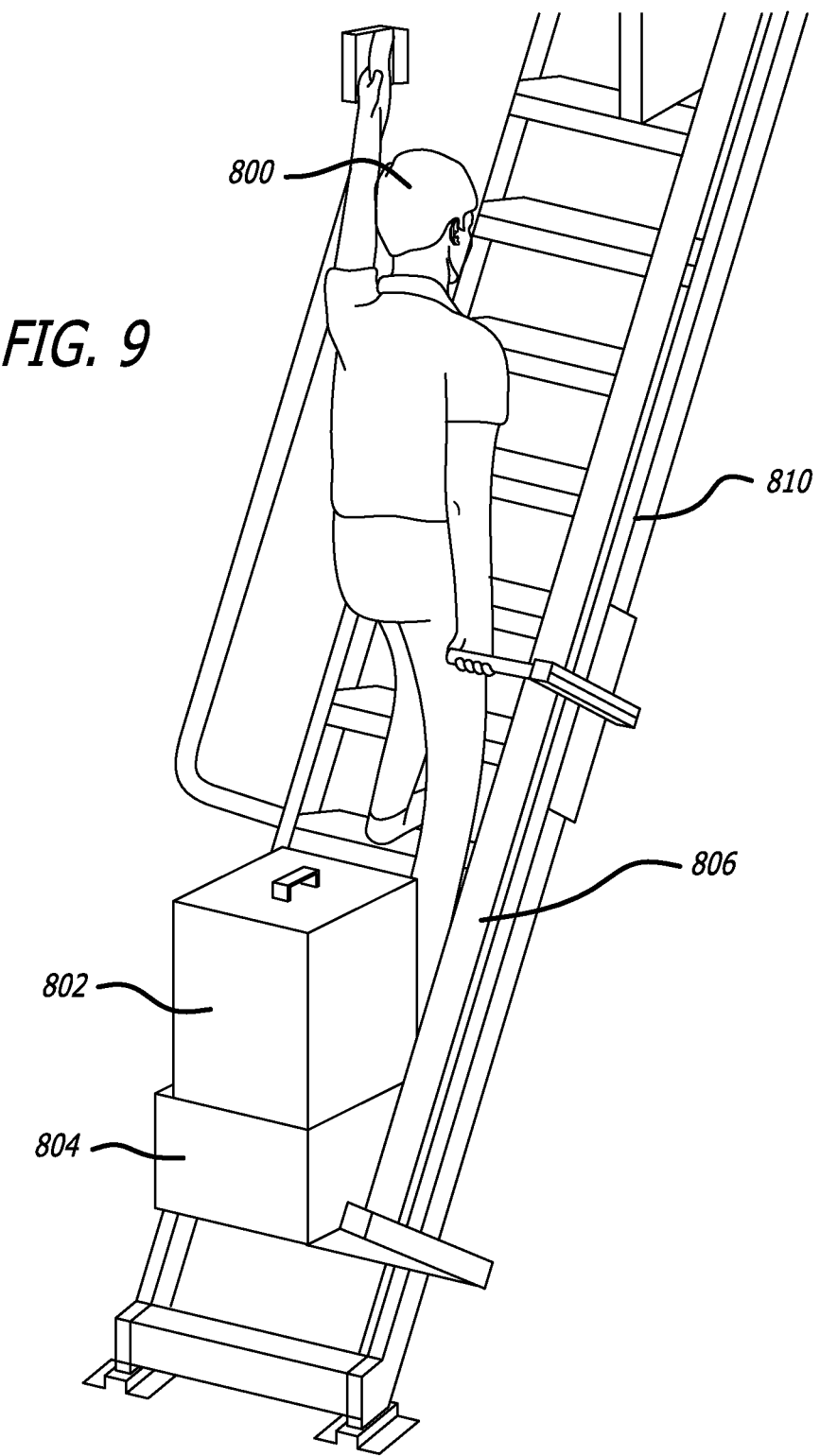
FIG. 9 is a perspective-side-view of the person (shown in FIG. 8) ascending the flight of steps with the luggage utilizing the OTS in accordance with the present disclosure.
Figure 10:
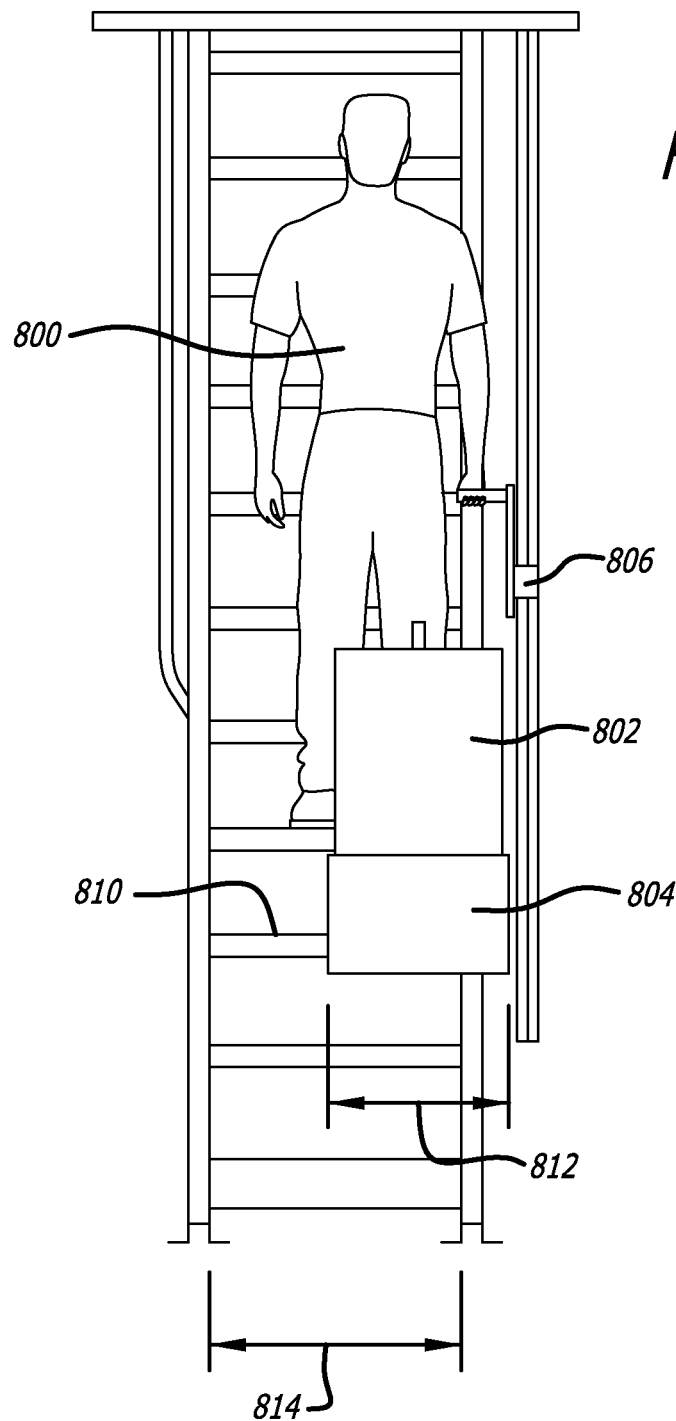
FIG. 10 is a front-view of the person (shown in FIGS. 8 and 9) ascending the flight of steps with the luggage utilizing the OTS.
Figure 11:
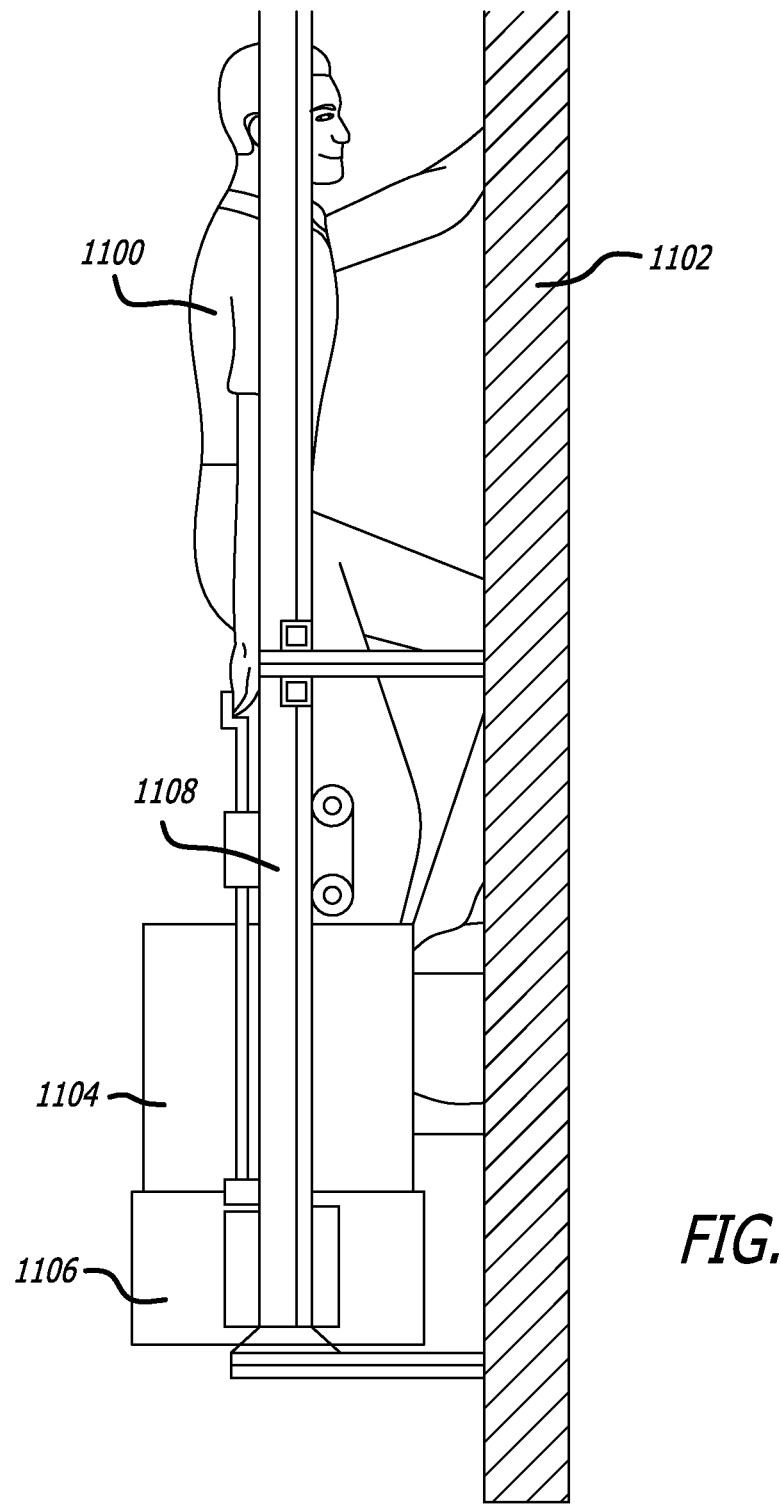
FIG. 11 is a side-view of another person ascending a ladder with luggage stored in a collapsible box utilizing the OTS in accordance with the present disclosure.

In FIG. 8, a side-view of person 800 loading a piece of luggage 802 onto the collapsible box 804 of the OTS 806 is shown. The OTS 806 is attached to the handrail 808 of an example flight of steps 810. In this example, the flight of steps 810 may be a crew access step-ladder assembly on an aircraft or access ladder or stairwell between levels in a ship, bus, truck, or building. In FIG. 9, a perspective-isometric-view is shown of the person 800 ascending the flight of steps 810 with the luggage 802 utilizing the OTS 806. Turning to FIG. 10, a front-view is shown of the person 800 ascending the flight of steps 810 with the luggage 802 utilizing the OTS 806. In this view it is appreciated that the extended collapsible box 804 has a horizontal width 812 that is less than the horizontal width 814 such that the person 800 is capable of walking around the extended collapsible box 804 to ascend the flight of steps 810. In FIG. 11, a side-view is shown of another person 1100 ascending a flight of steps 1102 with luggage 1104 stored a collapsible box 1106 utilizing the OTS 1108. However, in this example, the flight of steps 1102 is a vertical ladder and not an angled flight of steps.

In these examples, the handrail may be a plastic, fiber glass, or metallic handrail constructed of, for example, steel or aluminum. The first trolley, second trolley, locking system, and object carrier may also be constructed of, for example, plastic, fiber glass, or metal. Examples of the metals may be steel and aluminum.

Additionally, while the examples previously described include a pivoting actuating lever and handle, it is appreciated by one of ordinary skill in the art that the actuating lever and handle may not pivot. Specifically, the actuating lever and handle may utilize an axial linear motion to place the trolley assembly in a locked position, free moving position, and automatic descent position. As an example, the actuating lever may include a handle that does not pivot and always extends outward from the handrail in a fixed position (i.e., equivalent to the operational position described in FIG. 4D). The operating of the locking mechanism may be triggered by either pulling on the handle in an upward direction or pushing the handle in a downward direction. In this example, when the handle is pulled in an upward direction, the locking mechanism is placed in an unlocked state that allows the trolley assembly to be pulled up the handrail or manually guided down the handrail. The upward pulling force may cause the actuating lever to move a small distance along the axis of the actuating lever in a way the releases the locking mechanism where the locking mechanism may utilize various known techniques that may include spring loaded and friction locking sub-mechanisms. In this example, once the upward pulling force is released, a spring loaded mechanism may automatically pull the actuating lever back to the locked resting position that will lock the trolley assembly in place along the handrail. Similarly, if the user pushes downward on the handle, the actuating lever may be pushed into the locking mechanism and snapped into an automatic descending state that is configured to slide the trolley assembly down the handrail at a controlled speed. Once the trolley reaches the bottom of the handrail, the locking mechanism may be automatically snapped out of the automatic descend state and placed back into the locked resting state.

Figure 12:
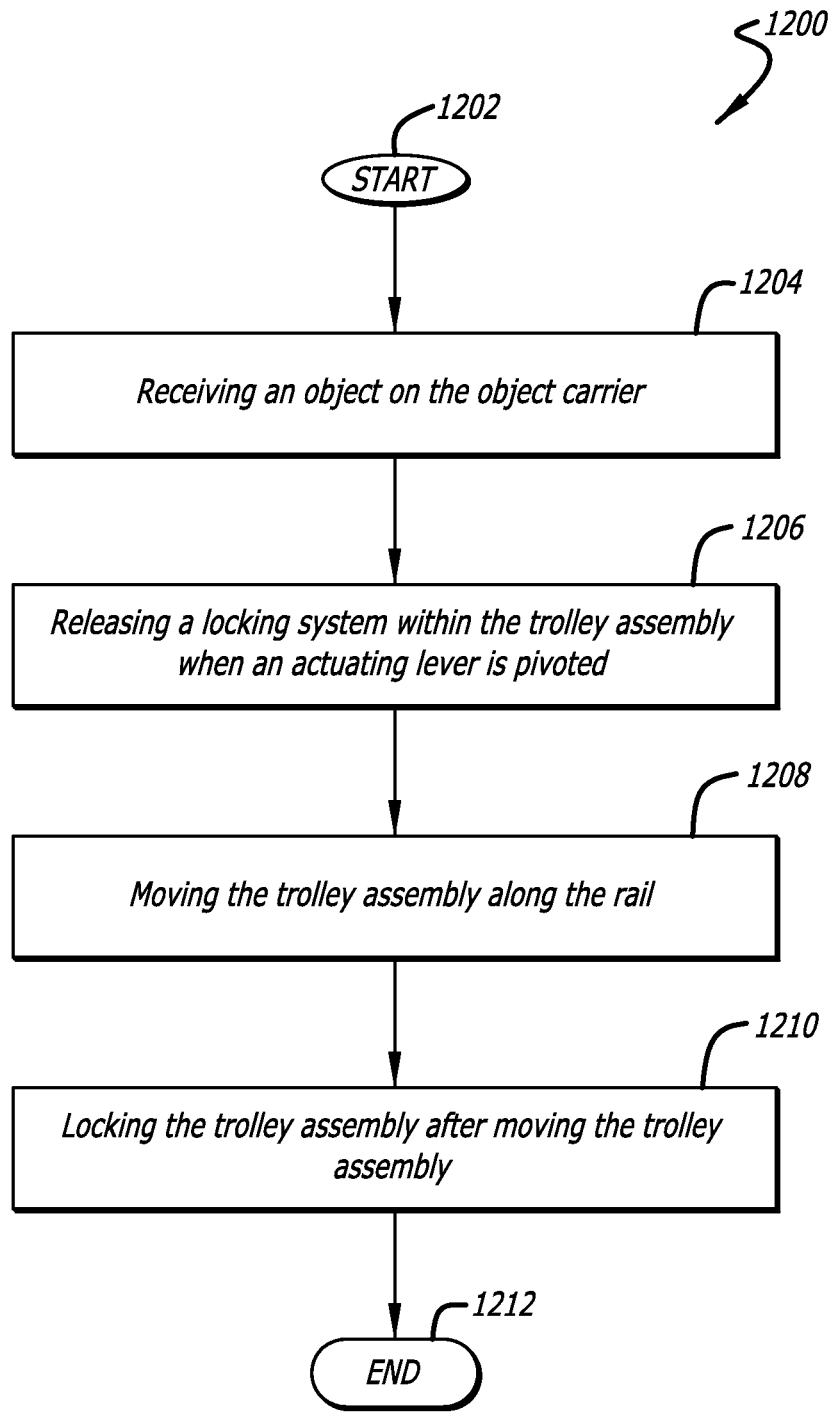
FIG. 12 is a flowchart illustrating the method performed by the OTS in accordance with the present disclosure.

Turning to FIG. 12, a flowchart 1200 illustrating the method performed by the OTS is shown in accordance with the present disclosure. The method starts 1202 by a person deploying the object carrier from the OTS and loading an object into the object carrier. As such, the OTS receives the object on the object carrier from the person, step 1204, and the locking system releases to allow free movement along the handrail when the actuating lever is pivoted to an operational position in step 1206 by the person. Once the locking system is released, the trolley assembly moves along the handrail, in step 1208, either in an ascending or descending direction based on whether the person is either ascending or descending. In the situation where the person is ascending the flight of steps, the person pulls the OTS up the handrail utilizing a handle on the actuating lever. Alternatively, in the situation where the person is descending the flight of steps, the person may either pull (via a handle on the actuating lever) the OTS so as to control the speed of the descent of OTS or place the actuating lever in an automatic descend position such that the OTS will slide down the handrail with a controlled speed. Once the OTS has reached the desired position on the flight of steps (i.e., the OTS is either and the top end or bottom end of the handrail), the person may release the actuating lever. Once released, the locking system locks the trolley assembly on the handrail in step 1210. The process then ends 1212.

It will be understood that various aspects or details of the disclosure may be changed without departing from the scope of the disclosure. It is not exhaustive and does not limit the claimed disclosures to the precise form disclosed. Furthermore, the foregoing description is for the purpose of illustration only, and not for the purpose of limitation. Modifications and variations are possible in light of the above description or may be acquired from practicing the disclosure. The claims and their equivalents define the scope of the disclosure.

What is claimed is:

1. An object transfer system ("OTS") for a flight of steps for transporting an object on the flight of steps, the OTS comprising:
   a rail positioned as a handrail on the flight of steps, wherein the flight of steps comprises a base and a plurality of steps;
   a trolley assembly movably attached to the rail; and
   an object carrier attached to the trolley assembly;
   wherein the rail has a rail length,
   wherein the object carrier is configured to hold the object, and
   wherein the trolley assembly is configured to transport the object held by the object carrier along the rail length.

2. The OTS of claim 1, wherein the trolley assembly is configured to be manually moveable along the rail.

3. The OTS of claim 1, wherein the trolley assembly includes
   a motion control system operable to control the motion of the trolley assembly along the rail,
   and an actuating lever connected to the motion control system and operable to provide a controlled motion along the rail.

4. The OTS of claim 3, wherein the actuating lever is an articulating actuating lever.

5. The OTS of claim 3, wherein the motion control system includes a braking system to prevent the motion of the trolley assembly along the rail in an uncontrollable manner.

6. The OTS of claim 5,
   wherein the braking system includes a friction unidirectional brake clutch, and
   wherein the friction unidirectional brake clutch is operable to control a speed of the trolley assembly in a downward direction along the rail.

7. The OTS of claim 3, wherein the actuating lever is coupled to a locking system that includes a spring loaded module that is configured to prevent the motion of the trolley assembly along the rail.

8. The OTS of claim 7, wherein the actuating lever is an articulating actuating lever,
   wherein the articulating actuating lever is configured to pivot perpendicularly from the rail from a locking position adjacent to the rail to an operational position pivotally away from the rail,
   wherein the locking system is configured to prevent movement of the trolley assembly along the rail when the articulating actuating lever is in the locking position, and
   wherein the spring loaded module is configured to keep the articulating actuating lever in the locking position.

9. The OTS of claim 1, wherein the object carrier is a foldable and collapsible object carrier.

10. The OTS of claim 1, wherein the flight of steps is a ladder, the plurality of steps is a plurality of rungs, and the base is a pair of ladder legs.

11. The OTS of claim 1, further including a retractable reel having a flexible material wound around the retractable reel,
   wherein the rail has a bottom end and a top end,
   wherein the retractable reel is attached to the rail at the top end, and
   wherein the flexible material has a first end attached to the retractable reel and a second end attached to the trolley assembly.

12. The OTS of claim 11, wherein the flexible material is a steel cable.

13. A method for transporting an object on a flight of steps with an object transfer system ("OTS"), the method comprising:
    receiving the object on an object carrier,
        wherein the object carrier is attached to a trolley assembly, and
        wherein the trolley assembly is movably attached to a rail positioned as a handrail on the flight of steps, wherein the flight of steps comprises a base and a plurality of steps;
    releasing a locking system within the trolley assembly when an actuating lever is pivoted;
    moving the trolley assembly along the rail; and
    locking the trolley assembly after moving the trolley assembly.

14. The method of claim 13, further including unfolding the object carrier prior to receiving the object on the object carrier.

15. The method of claim 13,
    wherein pivoting the actuating lever includes pivoting the actuating lever from a locking position adjacent to the rail to an operational position away from the rail, and
    wherein pivoting the actuating lever to the operational position includes releasing a spring loaded module within the trolley assembly.

16. The method of claim 15, wherein locking the trolley assembly includes pivoting the actuating lever from the operational position to the locking position, and
    activating the spring loaded module in response to pivoting the actuating lever to the locking position.

17. The method of claim 16, further includes applying a friction unidirectional brake clutch against the rail in response to the trolley assembly moving in a downward direction along the rail.

18. The method of claim 17, wherein moving the trolley assembly along the rail includes moving the trolley assembly along the rail in an upward direction, and
    retracting a flexible material attached to the trolley assembly with a retractable reel when moving the trolley assembly along the rail in the upward direction.

19. The method of claim 17, wherein moving the trolley assembly along the rail includes moving the trolley assembly along the rail in a downward direction, and
    extending a flexible material attached to the trolley assembly with a retractable reel when moving the trolley assembly along the rail in the downward direction.

20. The method of claim 19, wherein the flight of steps is a ladder, the plurality of steps is a plurality of rungs, and the base is a pair of ladder legs.

21. An object transfer system ("OTS") for a flight of steps for transporting an object on the flight of steps, the OTS comprising:
    a rail positioned as a handrail on the flight of steps, wherein the flight of steps comprises a base and a plurality of steps;
    an object carrier; and
    means for moving the object carrier along the rail,
    wherein the rail has a rail length,
    wherein the object carrier is configured to hold the object, and
    wherein the means for moving the object carrier along the rail is configured to transport the object held by the object carrier along the rail length.

22. The OTS of claim 21,
    wherein the means for moving the object carrier along the rail includes means for manually moving the object carrier along the rail, and
    means for controlling a motion of the object carrier along the rail,
    wherein the means for controlling the motion of the object carrier along the rail includes means for preventing the motion of the object carrier along the rail in a downward direction.

23. The OTS of claim 21, wherein the flight of steps is a ladder, the plurality of steps is a plurality of rungs, and the base is a pair of ladder legs.

* * * * *